(12) United States Patent
Anandjiwala et al.

(10) Patent No.: US 9,796,167 B2
(45) Date of Patent: Oct. 24, 2017

(54) FLAME-PROOFED ARTEFACT AND A METHOD OF MANUFACTURE THEREOF

(75) Inventors: Rajesh Anandjiwala, Port Elizabeth (ZA); Stephen Anthony Chapple, Port Elizabeth (ZA); Maya Jacob John, Port Elizabeth (ZA); Hans-Jürgen Schelling, Oldenburg (DE); Wilfried Michaelis, Ritterhude (DE); Michael Döcker, Bremen (DE); Berend Schoke, Twistringen (DE)

(73) Assignee: CSIR, Pretoria (ZA), part interest ( * ) Notice: Subject to any disclaimer, the term of this patent is extended or adjusted under 35 U.S.C. 154(b) by 580 days.

(21) Appl. No.: 14/362,811

(22) PCT Filed: Dec. 5, 2011

(86) PCT No.: PCT/IB2011/055458
§ 371 (c)(1),
(2), (4) Date: Jun. 4, 2014

(87) PCT Pub. No.: WO2013/084023
PCT Pub. Date: Jun. 13, 2013

(65) Prior Publication Data
US 2014/0302736 A1    Oct. 9, 2014

(51) Int. Cl.
*B32B 37/00*    (2006.01)
*B32B 37/14*    (2006.01)
(Continued)

(52) U.S. Cl.
CPC ............ *B32B 37/146* (2013.01); *B29C 41/22* (2013.01); *B32B 3/12* (2013.01); *B32B 5/24* (2013.01);
(Continued)

(58) Field of Classification Search
CPC ......... B32B 37/146; B32B 2307/3065; D06M 11/70; D06M 11/71; C08J 5/06; B29C 99/0021
See application file for complete search history.

(56) References Cited

U.S. PATENT DOCUMENTS 4,397,906 A * 8/1983 Nakagawa ............... C08J 5/124
428/195.1
5,309,690 A    5/1994 Symons
(Continued)

FOREIGN PATENT DOCUMENTS

CA            2 667 407        5/2008
DE    10 2008 046481 A1        3/2010
(Continued)

OTHER PUBLICATIONS

Lyons J. W., *The Chemistry & Uses of Fire Retardants*, pp. 169-170, Wiley Interscience, New York, 1970.
(Continued)

*Primary Examiner* — John Goff (57) ABSTRACT

A method of fabricating an artifact (15) includes treating natural fibers (110) with a non-halogenated flame retardant agent (120), the fibers (110) also being treated with a smoke suppressant (120). At least one pre-preg is formed (170, 180) from the treated natural fibers and from a resin composition (160) including a smoke suppressant (150) admixed therein (160). An uncured artifact is formed from a core or substrate (12) and the pre-preg, which provides a skin, and is cured (210). A non-fibrous silicate fire resistant material (190, 230) is introduced by: (i) admixing the fire resistant material with the resin composition, and/or (ii) applying the fire resistant material to an outer surface of the pre-preg or an outer surface of the skin of the uncured artifact, and/or (iii) applying the fire resistant material to an outer surface of the (Continued)

skin of the cured artifact. The invention extends to a flame-proofed artifact (15).

10 Claims, 2 Drawing Sheets

(51) Int. Cl.
| | |
|---|---|
| C08J 5/04 | (2006.01) |
| C08J 5/06 | (2006.01) |
| B29C 41/22 | (2006.01) |
| B32B 3/12 | (2006.01) |
| B32B 5/24 | (2006.01) |
| C08K 3/38 | (2006.01) |
| C08G 77/02 | (2006.01) |
| C08K 5/521 | (2006.01) |
| C08K 3/34 | (2006.01) |

(52) U.S. Cl.
CPC .............. *C08J 5/045* (2013.01); *C08J 5/06* (2013.01); *B32B 2260/021* (2013.01); *B32B 2260/046* (2013.01); *B32B 2307/3065* (2013.01); *B32B 2605/18* (2013.01); *C08G 77/02* (2013.01); *C08K 3/34* (2013.01); *C08K 3/38* (2013.01); *C08K 5/521* (2013.01); *Y10T 442/3602* (2015.04); *Y10T 442/3984* (2015.04)

(56) References Cited

U.S. PATENT DOCUMENTS

| | | | | |
|---|---|---|---|---|
| 5,714,419 | A * | 2/1998 | Choate | .................. C08J 5/042 264/257 |
| 6,194,477 | B1 * | 2/2001 | Cawse | .................. B32B 3/12 162/101 |
| 6,391,959 | B1 * | 5/2002 | Ninomiya | .................. C08L 61/06 524/495 |
| 7,232,605 | B2 | 6/2007 | Burgueno et al. | |
| 2006/0189236 | A1 | 8/2006 | Davis et al. | |
| 2007/0238379 | A1 | 10/2007 | Bhatnagar et al. | |
| 2008/0142436 | A1 * | 6/2008 | Bothe | .................. B01D 39/18 210/504 |
| 2008/0210914 | A1 | 9/2008 | Hansel et al. | |
| 2009/0069463 | A1 * | 3/2009 | Serizawa | .............. C08F 289/00 524/9 |
| 2009/0072086 | A1 * | 3/2009 | Smith | ................ B32B 3/12 244/119 |
| 2009/0326133 | A1 * | 12/2009 | Daly | .................. C08K 3/346 524/445 |
| 2010/0324192 | A1 | 12/2010 | Costard | |

FOREIGN PATENT DOCUMENTS

| | | |
|---|---|---|
| EP | 1 369 464 A2 | 12/2003 |
| EP | 1 842 957 A1 | 10/2007 |
| EP | 1 916 286 A2 | 4/2008 |
| EP | 2 089 456 A1 | 8/2009 |
| EP | 2 463 083 A2 | 6/2012 |
| IN | 206638 | 12/2003 |
| IN | 2003/000400 | 7/2005 |
| WO | WO 2007/020657 | 2/2007 |
| WO | WO 2008/058924 A1 | 5/2008 |
| WO | WO 2011/047804 A1 | 4/2011 |

OTHER PUBLICATIONS

Jang, J. et al., "The Effect of Flame Retardants on the Flammability and Mechanical Properties of Paper-sludge/Phenolic Composite", *Polymer Testing*, vol. 19, pp. 267-279, 2000.

World Intellectual Property Organization, International Search Report, dated Oct. 4, 2012, issued in International Application No. PCT/IB2011/055458.

Lewin M. et al., eds., "Flameproofing of Cellulosics", Plame-Retardant Polymeric Materials, pp. 23-24, Plenum Press, New York, 1975.

Matko, Sz. et al., "Flame Retardancy of Biodegradable Polymers and Biocoomposites", *Polymer Degradation and Stability*, vol. 88, pp. 138-145, 2005.

* cited by examiner

FIG 1

FIG 2 ized petroleum based

U.S. Pat. No. 7,232,605 describes composite structural members (e.g. panels or beams) which include polymers arranged in a two- or three-dimensional cellular skeletal structure and reinforced with fibres, which may be natural, and with nano-scale clay particles. The invention seeks to overcome the lower material stiffness of biocomposites by the use of cellular and sandwich structures. The polymers can be thermoset. It is stated that clay particles can double the tensile modulus and strength of numerous thermoset resins and, in addition, make the resin less permeable to liquids and gases, more flame retardant and tougher. The specification describes the manufacture of cellular beams and plates in which green hemp fibres or chopped flax fibres were impregnated with unsaturated polyester resin, with cells being formed with the use of removable rods. After the impregnation, curing was effected in an oven. Hybrid cellular sandwich panels are also described, which include skins cured integrally with a cellular core, the skins comprising a thermoset polymer, which may be nano-clay reinforced, and a natural or synthetic fibre mat.

US 2007/0238379 describes ballistic resistant composites and articles formed therefrom for use in airplanes and other vehicles. A central layer, preferably comprising of an aerospace-specification grade honeycomb material, is positioned between panels comprising of a plurality of non-woven fibrous layers, and then moulded into a structural member. Various high strength fibres are mentioned as being suitable for the panels including polyethylene fibres, aramid fibres, polybenzazole fibres, polyolefin fibres, polyvinyl alcohol fibres, polyamide fibres, polyethylene terephthalate fibres, polyethylene naphthalate fibres, polyacrylonitrile fibres, liquid crystal copolyester fibres, glass fibres, carbon fibres and rigid rod fibres. The fibrous layers are coated or impregnated with a polymeric composition and consolidated to form the panel. The polymeric composition is preferably a thermosetting plastics material. The panels may be attached to the honeycomb layer by means of an adhesive, with the panels preferably being independently moulded or consolidated prior to attachment to the honeycomb layer. Optionally, one or more layers of fire resistant material, such as fibre glass, aramid paper or a fibrous material impregnated with a fire resistant composition, may be attached to one or more surfaces of the panels to provide fire resistance. Alternatively, a fire resistant additive may be blended with the polymeric composition which is coated on the fibres. It is stated that the composites of the invention are particularly useful for the formation of structural members of airplanes or other vehicles, such as doors or bulkhead structures.

Phosphoric acid and its salts have been used for a long time as flame retardants for cellulosic fibres. Diammonium phosphate and ammonium phosphate, in particular, being the most widely used non-durable flame retardants for cellulosics (see for example Lyons J. W. *Cellulose: Textiles* in *The Chemistry & Uses of Fire Retardants*, pp 169-170, Wiley Interscience, New York, 1970 and Lewin M. and Sello S. B. *Flameproofing of Cellulosics* in Lewin M., Atlas S. M. and Pearce E. M. (Eds.), *Flame-Retardant Polymeric Materials*, pp 23-24, Plenum Press, New York, 1975).

Matko et al. applied diammonium phosphate to lignocellulosic fillers in an aqueous solution, followed by drying under an infrared lamp (see Matko Sz., Toldy A., Keszei S., Anna P., Bertalan, Gy. and Marosi Gy, Flame Retardancy of Biodegradable Polymers and Biocomposites, *Polymer Degradation and Stability*, 88, pp 138-145, 2005). The lignocellulosic materials (fillers) were wood flake, of 1.2 mm size, and corn shell, of 3-12 mm size. The polymer matrix was polyurethane.

It is to be appreciated that most current work on flame retardancy of natural fibre reinforced composites is concerned mainly with thermoplastic resins such as polypropylene.

Jang et al. produced paper-sludge/phenolic composites which contained flame retardants selected from phosphate/halogen, halogenated and inorganic flame retardants (see Jang J., Chung H., Kim M. and Sung H., The Effect of Flame Retardants on the Flammability and Mechanical Properties of Papersludge/Phenolic Composites, *Polymer Testing*, 19, pp 267-279, 2000). The inorganic flame retardants were mixed with the resin whereas the phosphate/halogen combinations were dissolved in a solvent before addition to the paper-sludge.

What is ideally required is a method of fabricating an artefact such as a panel which is environmentally-friendly and which has suitable characteristics for use in aircrafts i.e. lightness of weight, adequate strength and compliance with fire, smoke and toxicity requirements.

In artefacts comprising of resin-fibre compounds, the use of natural fibres, although advantageous from the view of being environmentally friendly, presents particular challenges when the artefacts require suitable FST characteristics for use in aircraft. In particular, the FAA Airworthiness maximum allowable values for OSU heat release (peak, 5 min), OSU heat release (2 min) and smoke density for decorated panels are 65 $kW/m^2$, 65 $kW \cdot min/m^2$ and 200 Ds respectively, and the AIRBUS maximum allowable values for OSU heat release (peak, 5 min), OSU heat release (2 min) and smoke density for panels in an undecorated form are 35 $kW/m^2$, 35 $kW \cdot min/m^2$ and 20 Ds, respectively.

Natural fibres are problematic in that they are particularly flammable and thus tend to require more flame retardant treatment than synthetic fibres. However, flame retardant agents tend to negatively affect the physical properties of the material. For good fibre-matrix adhesion when natural fibres are used, a resin of low viscosity is required to enable adequate penetration of the fibres. However, the addition of flame-retardant agents to the resin tends to increase the viscosity of the resin and can thus lead to poor fibre-matrix adhesion. This limits the amount of flame retardant agent that can be added to the resin in order to obtain adequate flame retardant properties. It is, moreover, difficult to treat natural fibres in an environmentally-friendly manner. Non-halogenated flame retardants, although advantageous for environmental considerations, tend to be less effective than halogenated flame retardants. The use of non-halogenated flame retardants on cellulosic materials generally increases smoke production.

Thus, the fabrication of an artefact with natural fibres which has suitable FST characteristics for use in aircraft is problematic, and there is a need for improvement on existing fabrication methods and their products.

SUMMARY OF THE INVENTION

According to a first aspect of the invention there is provided a method of fabricating an artefact, the method including treating natural fibres by applying a non-halogenated flame retardant agent to the fibres;

forming at least one pre-preg from the treated natural fibres and a resin composition, the formation of the pre-preg including impregnating the treated natural fibres with the resin composition;

forming an uncured artefact from a core or substrate and said at least one pre-preg, the formation of the uncured artefact including using the at least one pre-preg to provide a skin on at least one side of the core or substrate; and forming a cured artefact by curing the uncured artefact and thereby also bonding the skin to the core or substrate, the method further including introducing a non-fibrous silicate fire resistant material using one or more of the following steps:

(i) admixing the non-fibrous silicate fire resistant material with the resin composition prior to or during the forming of the at least one pre-preg, (ii) applying the non-fibrous silicate fire resistant material to an outer surface of the at least one skin of the uncured artefact, or to a surface of the pre-preg used to provide the skin, (iii) applying the non-fibrous silicate fire resistant material to an outer surface of the at least one skin of the cured artefact, the method further including treating the natural fibres with a smoke suppressant prior to the impregnation of the natural fibres with the resin composition and admixing a smoke suppressant in the resin composition that impregnates the fibres.

In this specification, the term "non-halogenated flame retardant agent" is intended to refer to a flame retardant agent which includes a non-halogenated flame retardant as the only or as the major (highest concentration) flame retardant. Conveniently, certain smoke suppressants may also act as flame retardants and may be included in the non-halogenated flame retardant agent. Thus, the smoke suppressant with which the natural fibres are treated may be included in the flame retardant agent which is applied to the natural fibres.

In this specification, the term "flame retardant" refers to a substance applied or added to a material which is capable of delaying the ignition of the material or of suppressing or reducing the flammability of the material.

In this specification, the term "fire resistant material" refers to a material which does not burn, or a material that is able to burn only with difficulty.

The artefact may be a panel. The formation of the uncured artefact may thus include using the at least one pre-preg to provide a skin at least on opposed sides of the core.

The natural fibres may be in the form of a structure, which may be a woven or non-woven or knitted fabric or a combination thereof. In particular, the natural fibre structure may be a woven flax fabric. Other natural cellulosic fibres may be suitable for use in the invention, including bast fibres like hemp and kenaf, and other fibres such as bamboo.

The resin composition may be or may include predominantly a thermoset resin, more specifically a phenolic based resin.

The non-halogenated flame retardant agent may be applied to the natural fibres in the form of a solution or dispersion of the non-halogenated flame retardant agent, preferably an aqueous solution or dispersion. The treatment with the solution or dispersion of the non-halogenated flame retardant agent may be performed by known methods of impregnating natural fibres. In particular, the treatment with the solution or dispersion of the non-halogenated flame retardant agent may be performed by padding it onto the natural fibres. The treated natural fibres may be dried prior to impregnating the treated natural fibres with the resin composition. In particular, the treatment may be followed by drying the treated natural fibres at a temperature of between about 110° C. and about 130° C., preferably at about 120° C. for about 1 minute.

The non-halogenated flame retardant agent may include a non-halogenated flame retardant which acts in the condensed phase. The non-halogenated flame retardant agent may be based on or may include an ammonium salt of an inorganic acid as the non-halogenated flame retardant. The non-halogenated flame retardant agent may be or may include a phosphate-based flame retardant. More specifically, the non-halogenated flame retardant in the flame retardant agent may be a phosphoric acid salt. The non-halogenated flame retardant agent may be based on or it may include a di-ammonium phosphate flame retardant.

As will be appreciated, the pre-preg includes the resin composition in a partially cured state (often referred to as partially cured to a B-stage). The uncured artefact thus includes said skin with partially cured resin composition and in the cured artefact the resin composition in the skin is fully cured, bonding the skin to the core or substrate.

The non-halogenated flame retardant agent may include an acrylic resin or polymer.

The proportion of the non-halogenated flame retardant in the non-halogenated flame retardant agent may be between about 1% and about 50% solids by mass, preferably between about 15% and about 30% solids by mass.

The non-halogenated flame retardant agent may include an alkali.

As indicated above, the smoke suppressant with which the natural fibres are treated may be included in the flame retardant agent which is applied to the natural fibres. The proportion of the smoke suppressant in the non-halogenated flame retardant agent may be between about 1% and about 15% by mass, preferably about 5% by mass. The smoke suppressant is preferably one that has a relatively low toxicity and is preferably hydrated. The smoke suppressant is preferably a zinc borate. More preferably, the smoke suppressant is a zinc borate having a formulation such that it undergoes a weight loss of about 1% when heated to between about 180° C. and 230° C., and a weight loss of about 10% when heated to about 270° C.

Conveniently, zinc borate is a smoke suppressant which also has flame retardant properties. Zinc borate is more commonly used as an additive in polymers. It is only sparingly soluble in water. The zinc borate (5-hydrate) may be produced on-site by known methods. Otherwise, a commercial smoke suppressant such as Chemtura ZB223 available from Chemtura Corporation, 1801 U.S. Highway 52 West, West Lafayette, Ind. 47906, USA may be used.

The presence of the zinc borate smoke suppressant in the non-halogenated flame retardant agent is more effective in achieving reduced heat release values and a reduced smoke production than a non-halogenated flame retardant without the zinc borate smoke suppressant, as is demonstrated by the results of a test done on double fabric at a heat flux of 35 kW/m$^2$ shown in Table 1. It is believed that the non-halogenated flame retardant agent and the zinc borate smoke suppressant operate synergistically to achieve the improved heat release values.

TABLE 1

Tested characteristics of a natural fibre structure treated with non-halogenated flame retardant agent and/or a zinc borate smoke suppressant

| | Non-halogenated flame retardant (Phosphate based) % solids by mass in non-halogenated flame retardant agent | Smoke suppressant (Zinc borate) % solids by mass in non-halogenated flame retardant agent | Peak Heat Release (5 minutes) ($kW/m^2$) | Heat Release (2 minutes) ($kW \cdot min/m^2$) | Smoke Factor ($kW/m^2$) |
|---|---|---|---|---|---|
| Single fabric, tested at heat flux of 25 $kW/m^2$ | 0 | 0 | 79.6 | 48.5 | 190 |
| | 0 | 2.4 | 78.4 | 47.6 | 232 |
| | 19 | 0 | 11.9 | 11.7 | 236 |
| Double fabric, tested at heat flux of 35 $kW/m^2$ | 18 | 0 | 18.8 | 24.2 | 442 |
| | 18 | 1.5 | 18.1 | 22 | 437 |
| | 18 | 4.0 | 14.9 | 15.3 | 301 |
| | 23 | 0 | 21.8 | 24.9 | 521 |
| | 23 | 1.5 | 17.8 | 18.1 | 429 |
| | 23 | 4.0 | 9.2 | 12 | 194 |

Tested according to ISO 5660-1, 5660-2 (Test time 5 minutes)
Smoke factor = product of peak heat release and total smoke release Instead, the smoke suppressant with which the fibres are treated prior to the impregnation may be a nanoclay, which can have a flame retardant effect and can also act as a smoke suppressant, the nanoclay being applied to the natural fibres, for example by admixing it into the flame retardant agent prior to padding. The nanoclay may be a proprietary product, e.g. a halloysite product which is obtainable from Aldrich. Halloysite is a 1:1 aluminosilicate clay mineral with the empirical formula $Al_2Si_2O_5(OH)_4$.

As indicated above, a non-fibrous silicate fire resistant material may be admixed with the resin composition prior to or during the forming of the pre-preg. The fire resistant material may be added in the form of a dispersion. More particularly, the non-fibrous silicate fire resistant material may be admixed with the resin composition using step (i) referred to above, the non-fibrous silicate fire resistant material being in the form of an aqueous dispersion of the non-fibrous silicate fire resistant material when it is admixed with the resin composition.

The fire resistant material may be a silicate material belonging to the group of minerals known as phyllosilicates (sheet silicates), including clay minerals, the mica group of minerals, for example muscovite, and other phyllosilicates such as pyrophyllite. Fibrous materials such as asbestos can be hazardous. As indicated above, the fire-resistant material is non-fibrous. Instead of or in addition to phyllosilicates, the fire resistant material may consist of or include non-fibrous silicate materials such as perlite. The fire resistant material may be a naturally occurring material.

In particular, the fire resistant material may be vermiculite. Vermiculite, a phyllosilicate material, undergoes expansion on application of heat which is referred to as exfoliation. The structure of the phyllosilicate materials includes a hydrated layered configuration of silicates which forms hinged plates that unfold in a linear manner when heated. This results in trapped water escaping as steam, aiding in fire resistance. Vermiculite, a naturally occurring material, is light-weight, non-toxic, and has good thermal insulating and fire resistance properties. If vermiculite is admixed with the resin composition, the vermiculite may be added as a dispersion, in particular an aqueous dispersion, and the proportion of vermiculite in the dispersion may be between about 5% and about 20% by mass in the dispersion, preferably between about 15% and about 17.5% by mass in the dispersion. The vermiculite is obtainable from W.R. Grace & Co, U.S.A, being supplied under the name MicroLite®. The percentage of vermiculite dispersion in the resin may be between about 5% and about 10% by mass.

The smoke suppressant that may be admixed with the resin composition may be a zinc borate, preferably a zinc borate having a formulation such that it undergoes a weight loss of about 1% when heated to between about 250° C. and 330° C., and a weight loss of about 10% when heated to about 400° C. The proportion of smoke suppressant in the resin composition may be between about 1% and about 15% by mass of resin solids.

Forming at least one pre-preg from the treated natural fibres and a resin composition may include heating the impregnated natural fibres, e.g. in an oven. In particular, the impregnated natural fibres (pre-pregs) may be heated at a temperature range of about 120° C. to about 140° C.

The percentage of resin composition in the skin or skins of the artefact may vary from about 40% to about 60% by mass, preferably approximately 50% by mass.

The core or substrate is typically cellular, and may be of a honeycomb or foam material. Typically, honeycomb structures are used. Suitable material for the core include fire-resistant Nomex (trade name), flame retarded polymers, balsa wood and aluminium.

The non-fibrous silicate fire resistant material that may be applied to an outer surface of the at least one skin of the uncured or cured artefact may be a silicate material belonging to the group of minerals known as phyllosilicates (sheet silicates), as hereinbefore described, e.g. vermiculite (a naturally occurring material). As hereinbefore described, the vermiculite is obtainable from W.R. Grace & Co, U.S.A, being supplied under the name MicroLite®. Instead, the vermiculite may be micron grade vermiculite (a hydrated phlogopite mica) obtainable from Palabora Mining Company Limited, 1 Copper Road, 1389 Phalaborwa, South Africa.

The amount of vermiculite applied per unit area of each surface treated with the vermiculite may be between about 20 $g/m^2$ and about 90 $g/m^2$, e.g. approximately 45 $g/m^2$.

The non-fibrous silicate fire resistant material may be applied as a dispersion, e.g. an aqueous dispersion, to an outer surface of the at least one skin of the uncured or cured artefact. If the non-fibrous silicate fire resistant material is vermiculite, the percentage of vermiculite in the dispersion may be between about 5% and about 20% by mass, preferably between about 15% and about 17.5% by mass.

If necessary or desirable, the non-fibrous silicate fire resistant material applied to an outer surface of the at least one skin of the cured artefact may be dried at temperatures of between about 70° C. and about 90° C.

Forming a cured artefact by curing the uncured artefact may be effected by compression moulding of the uncured artefact, e.g. in a pre-heated mould which is at an initial temperature of between about 100° C. and about 120° C., the temperature in the mould subsequently being increased to between about 130° C. and about 145° C. Curing also leads to bonding of the skin to the core or substrate.

More particularly, the compression moulding in the pre-heated mould may be performed at an initial temperature of about 110° C. for about 10 minutes. The compression moulding in the pre-heated mould may be performed by later increasing the temperature to between about 130° C. to about 145° C. for between about 50 minutes and about 90 minutes, preferably about 70 minutes.

According to a second aspect of the invention there is provided a flame-proofed artefact suitable for use in an aircraft, the artefact including a core or substrate with a cured skin on at least one side of the core or substrate, the cured skin being formed from at least one pre-preg which includes natural fibres impregnated with a resin composition, where the natural fibres have been treated with a non-halogenated flame retardant agent prior to being impregnated with the resin composition, a non-fibrous silicate fire resistant material being included in or on one or more components of the artefact in one or more of the following ways:
(i) the non-fibrous silicate fire resistant material being admixed with the resin composition which impregnates the natural fibres, so that the cured skin includes the non-fibrous silicate fire resistant material in a resin matrix of the skin
(ii) the non-fibrous silicate fire resistant material being applied to an outer surface of the skin prior to curing of the skin, or to a surface of the pre-preg used to provide the skin, so that the outer surface of the cured skin has a layer rich in the non-fibrous silicate fire resistant material
(iii) the non-fibrous silicate fire resistant material being applied to an outer surface of the cured skin, so that the outer surface of the cured skin has a layer rich in the non-fibrous silicate fire resistant material,
the artefact including a smoke suppressant which has been admixed with the resin composition which impregnates the natural fibres, so that the cured skin includes the smoke suppressant in the resin matrix of the skin, a smoke suppressant also being included in the natural fibres by the natural fibres having been treated with the smoke suppressant prior to being impregnated with the resin composition.

The artefact may be a panel, in particular a panel with a cured skin at least on opposed sides of the core.

The natural fibres may be as hereinbefore described and may thus be in the form of a structure, which may be a woven or non-woven or knitted fabric or a combination thereof. In particular, the natural fibre structure may be a woven flax fabric.

The resin composition may be as hereinbefore described and may thus be or may thus include as a major component a thermoset resin, more specifically a phenolic based resin.

The smoke suppressant with which the natural fibres have been treated may have been included in the flame retardant agent with which the natural fibres are treated, and may be a zinc borate or a nanoclay. As indicated above, a zinc borate or a nanoclay also advantageously have flame retardant properties.

The proportion of smoke suppressant in the resin may be between about 1% and about 15% by mass of resin solids. The smoke suppressant in the resin may advantageously also have flame retardant properties, for example the smoke suppressant may be a zinc borate or nanoclay. Preferably, the smoke suppressant is a zinc borate.

In an embodiment of the invention, the smoke suppressant admixed with the resin composition that impregnates the fibres is a zinc borate and the smoke suppressant which the natural fibres are treated prior to their impregnation is a zinc borate.

The non-halogenated flame retardant agent may include a flame retardant which acts in the condensed phase, as hereinbefore described. The non-halogenated flame retardant agent may thus be based on or may include an ammonium salt of an inorganic acid as the flame retardant. The non-halogenated flame retardant agent may be or may include a phosphate-based flame retardant. More specifically, the flame retardant in the non-halogenated flame retardant agent may be a phosphoric acid salt. The non-halogenated flame retardant agent may be based on or it may include a di-ammonium phosphate flame retardant.

The non-halogenated flame retardant agent may include an acrylic resin or polymer, as hereinbefore described.

The non-halogenated flame retardant agent may include an alkali, as hereinbefore described.

As hereinbefore described, the percentage of resin composition in the skin or skins of the artefact may vary from about 40% to about 60% by mass, preferably approximately 50% by mass.

The core or substrate is typically cellular, and may be of a honeycomb or foam material, as hereinbefore described.

The non-fibrous silicate fire resistant material that may be applied to an outer surface of the skin prior to curing of the skin, so that the outer surface of the cured skin has a layer rich in the non-fibrous silicate fire resistant material, may be a silicate material belonging to the group of minerals known as phyllosilicates (sheet silicates), as hereinbefore described, e.g. vermiculite (a naturally occurring material), as also hereinbefore described. Similarly, the non-fibrous silicate fire resistant material that may be applied to an outer surface of the cured skin, so that the outer surface of the cured skin has a layer rich in the non-fibrous silicate fire resistant material, may be a silicate material belonging to the group of minerals known as phyllosilicates (sheet silicates), as hereinbefore described, e.g. vermiculite (a naturally occurring material), as also hereinbefore described.

If vermiculite is used, the amount of vermiculite applied per unit area of each surface treated with vermiculite may be between about 20 g/m$^2$ and about 90 g/m$^2$, e.g. approximately 45 g/m$^2$.

The artefact may have a heat release (peak) value, as measured from the Ohio State University heat release apparatus (OSU), of less than 40 kW/m$^2$, preferably less than 35 kW/m$^2$, more preferably less than 30 kW/m$^2$, in an undecorated form.

The artefact may have a heat release (2 min) OSU value of less than 50 kW·min/m$^2$, preferably less than 40 kW·min/m$^2$, more preferably less than 35 kW·min/m$^2$, even more preferably less than 30 kW·min/m$^2$, in an undecorated form.

For avoidance of any doubt, it is to be noted that all of the core material, the natural fibres, the resin composition, the non-halogenated flame retardant agent, the smoke suppressant, the flame retardant and the non-fibrous silicate fire resistant material may be as described hereinbefore with reference to the first aspect of the invention.

BRIEF DESCRIPTION OF THE DRAWINGS

The invention will now be described in greater detail by way of non-limiting, illustrative examples with reference to the following diagrammatic drawings in which.

DETAILED DESCRIPTION WITH REFERENCE TO THE DRAWINGS

Figure 1:
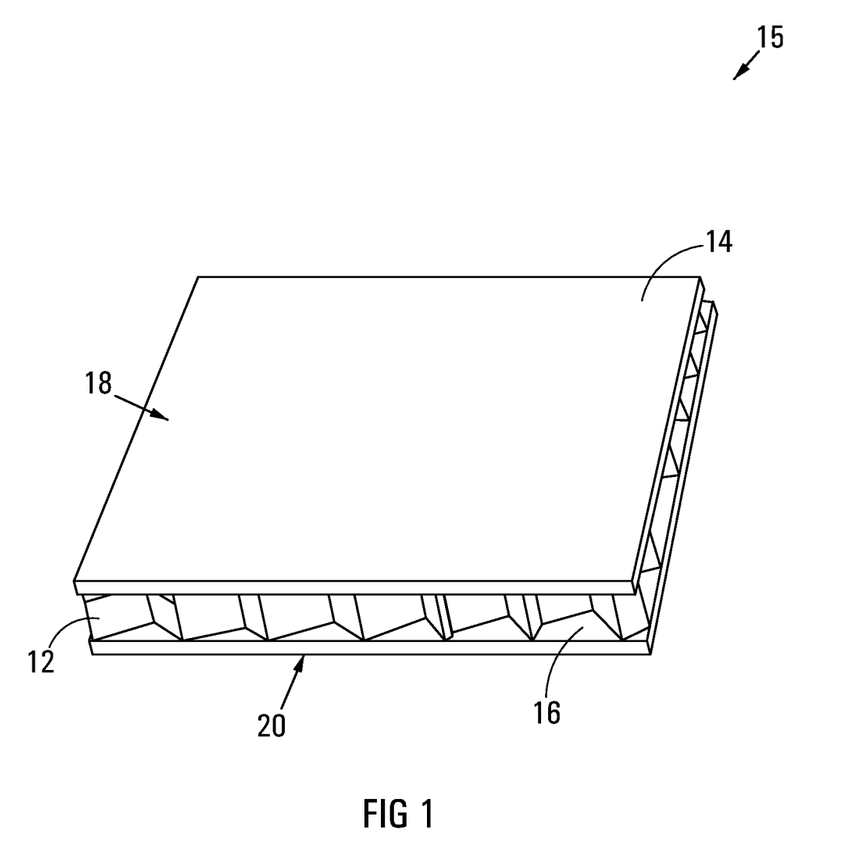
FIG. 1 shows schematically in a three-dimensional view a flame-proofed artefact in accordance with the invention.

Referring to FIG. 1, an embodiment of a flame-proofed artefact in accordance with the invention is designated generally by reference numeral 15. The artefact 15 is in the form of a panel and is suitable for use in aircraft. The panel 15 includes a honeycomb core 12 and cured skins 14 and 16, between which the core 12 is sandwiched. It should be noted that, instead of a honeycomb core, foam can be used as a core for making artefacts, such as panels, suitable for use in other applications, such as in construction of buildings, for example.

The cured skins 14 and 16 each include natural fibres impregnated with a resin composition, the natural fibres having been treated with a non-halogenated flame retardant agent prior to being impregnated with the resin composition. Outer surfaces 18, 20 of the panel 15 (i.e. the outer surfaces of the cured skins 14, 16) are coated with vermiculite.

The cured skins 14, 16 are formed from pre-pregs, which are then cured. In this example, the natural fibres used for the pre-pregs from which the cured skins 14 and 16 are formed are in the form of a woven flax fabric. The resin composition is a thermoset resin, more specifically a phenolic resin.

Figure 2:
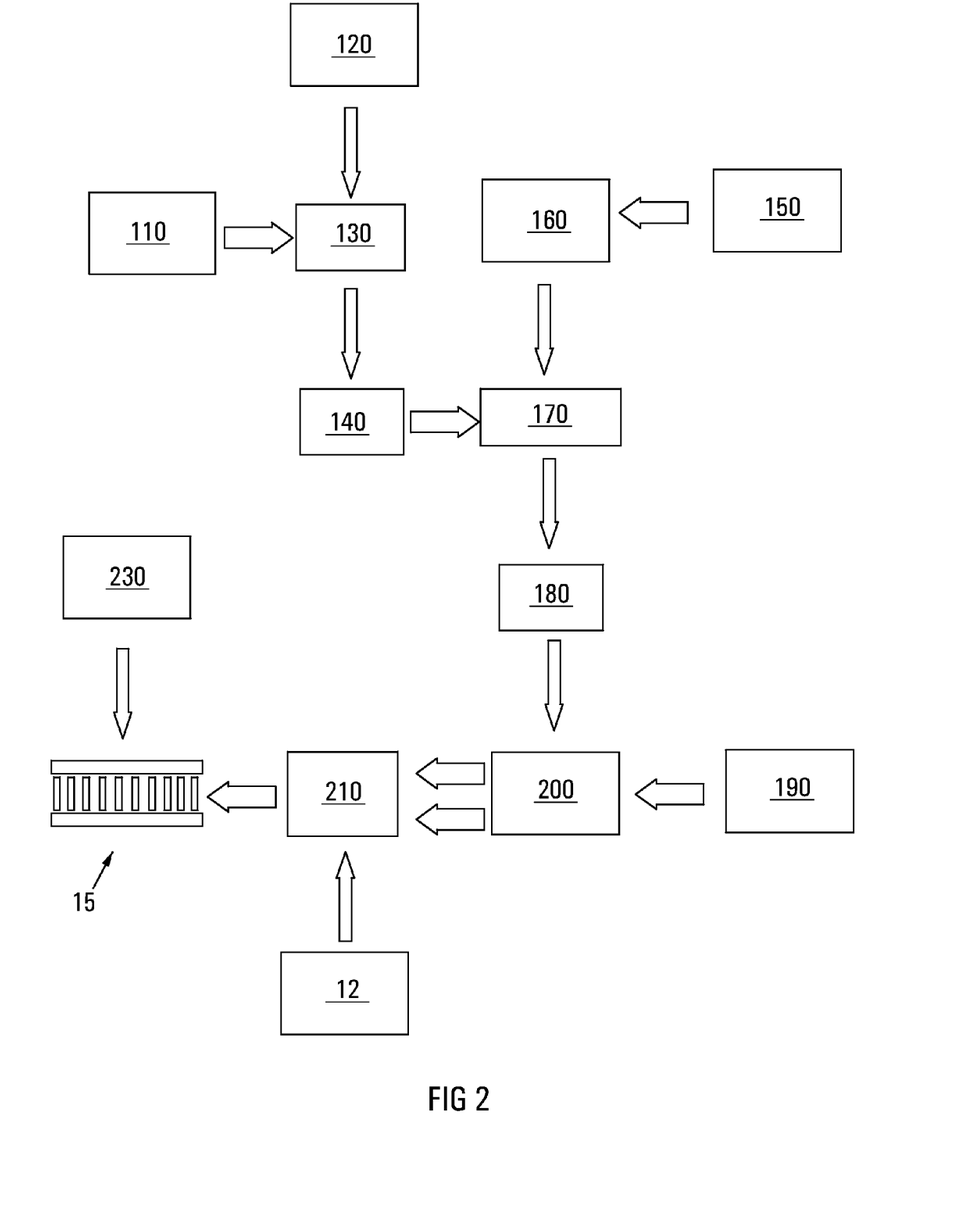
FIG. 2 shows schematically process steps forming part of a method in accordance with the invention for fabricating an artefact in accordance with the invention.

FIG. 2 is a schematic diagram showing the method of fabricating the panel 15. Fabric 110 is subjected to treatment with an aqueous non-halogenated flame retardant agent 120. More specifically, in step 130, the non-halogenated flame retardant agent 120 is padded onto the fabric, which is then dried in a drying step 140, which takes place in an oven at a temperature of about 120° C. for a duration of about 1 minute. The non-halogenated flame retardant agent includes a non-halogenated flame retardant which is a proprietary product, Flammentin TL833, supplied by ACTI, Westville, 3630, South Africa. Flammentin TL833 is a liquid, marketed as a flame retardant based on ammonium salts of inorganic acids. It is believed that it contains di-ammonium phosphate as the major flame retardant in the composition, and may possibly also include an acrylic resin or polymer. The proportion of the flame retardant in the non-halogenated flame retardant agent is between about 15% and about 30% solids by mass, i.e. typically between about 20% and 25% solids by mass.

The non-halogenated flame retardant agent 120 includes a smoke suppressant, in particular a zinc borate. The proportion of zinc borate in the non-halogenated flame retardant agent 120 is about 5% by mass. Zinc borate (5-hydrate) can be produced on-site by known methods.

In an alternative embodiment of the invention, in place of the zinc borate, a nanoclay, in the form of a proprietary halloysite product, obtainable from e.g. Sigma-Aldrich, which has offices in many countries, e.g. Sigma-Aldrich (Pty) Ltd of PO Box 10434, Aston Manor 1630, South Africa, is admixed with the non-halogenated flame retardant agent (Flammentin TL833 in this example) and water to form an admixture, and the admixture is padded onto the fabric.

Further, a zinc borate as a smoke suppressant, represented by block 150, is also admixed thoroughly with a phenolic resin composition 160, the proportion of zinc borate in the skins 14, 16 after the formation of the panel 15 amounting to approximately 11% of the solid resin. The phenolic resin composition is proprietary Eponol (trade name) Resin 2485 obtainable from Momentive Specialty Chemicals Inc. of 180 East Broad Street, Columbus, Ohio, USA. EPONOL™ Resin 2485 is a phenolic resin which is designed for pre-preg applications. The pre-pregs have a good draping quality, and are suitable for the production of composite components with, e.g., a Nomex (trade name) honeycomb core as used, for example, in the internal lining of aircraft (e.g. AIRBUS (trade name) side panels and luggage racks). After the drying step 140, the fabric 110 is impregnated with the resin composition with the zinc borate to form pre-pregs or skins in an impregnating step 170, and a heating step 180, in which the resin composition is partially cured to a B-stage. In the heating step 180, the heating is taking place in an oven at a temperature range of 120° C. to 140° C. for 10 minutes.

In a step 200, a fire resistant material in the form of vermiculite (VMT) (obtained from Palabora Mining Company Limited, 1 Copper Road, 1389 Phalaborwa, South Africa; micron grade), represented by block 190, is applied onto surfaces of the pre-pregs or skins produced in step 180. The mass per unit area of vermiculite applied to the surfaces is approximately 45 g/m$^2$.

The panel 15 is formed by sandwiching a honeycomb core 12 [e.g. a Nomex (trade name) honeycomb core] between the vermiculite coated pre-pregs or skins produced in step 200, and bonding of the skins to the core 12 is effected by compression moulding, in a compression moulding step 210, the step 210 taking place in a pre-heated mould at an initial temperature of 110° C. for 10 minutes which is later increased to between 130° C. and 145° C. for 70 minutes, to ensure full curing of the resin composition in the pre-pregs/skins. It is to be mentioned that no adhesives are necessary in this process for bonding the core 12 to the skins, during which the skins are also fully cured. The proportion of resin in the cured skins 14, 16 is approximately 50% by mass.

In an alternative embodiment of the invention, an aqueous dispersion of vermiculite, represented in FIG. 2 by block 230, may be applied to the outer surfaces of the panel 15, once the panel 15 has been formed, and the panel 15 may then be dried at temperatures of between 70° C. and 90° C. in an oven. FIG. 2 illustrates both the application of a fire resistant material (such as vermiculite) to the skins and the application of a fire resistant material to the outer surfaces of the cured skins after compression moulding.

In yet another alternative embodiment of the invention (not shown), an aqueous dispersion of vermiculite can, instead of or in addition to being applied to the outer surfaces of cured or uncured skins, be added into the resin, 160, for example prior to the impregnation of the natural fibres. In the fabrication of the panel 15 described above, however, the vermiculite is only applied to the uncured skins prior to the compression moulding and curing thereof.

As indicated in Table 2 below, various panels, referred to as Panels 1, 3, 4, 5, 6 and 15 were fabricated and their characteristics were tested, including their flammability, smoke density and heat release values. Panel 15 was fabricated as described above. Panel 1 was produced using the same method as for Panel 15 save that no vermiculite was applied to the surfaces of the panel, there was no pre-heating of the mould prior to compression moulding, the panel has lower resin content and the non-halogenated flame retardant agent had a lower concentration of Flammentin TL833 and zinc borate. Panel 3 was produced using the same method as for Panel 1 save that a higher resin content was used for Panel 3. Panel 4 was produced using the same method as for Panel 3 save that the aqueous solution of Flammentin TL833 and zinc borate used for Panel 4 had a lower concentration of Flammentin TL833. Panel 5 was produced using the same method as for Panel 3 save that halloysite nano-clay, instead of zinc borate, was included in the formulation of the non-halogenated flame retardant agent which was applied to the natural fibres prior to impregnation with the resin. Panel 6 was produced using the same method as for Panel 3 save that the aqueous solution of Flammentin TL833 and zinc borate used for Panel 6 had a higher concentration of both Flammentin TL833 and zinc borate.

their use can lead to fuel and energy savings and can provide a $CO_2$ credit in an aircraft life cycle analysis.

The flame retardant treatment approach taken in this invention, i.e. the treatment of the fibres with the non-halogenated flame retardant agent prior to impregnation with a resin, advantageously avoids major polymer modification with additives which may otherwise have been required to impart suitable characteristics to permit use in aircraft applications, i.e. lightness of weight, adequate strength and compliance with fire, smoke and toxicity requirements.

As indicated above, the AIRBUS limiting values for OSU heat release (peak, 5 min), OSU heat release (2 min) and smoke density for panels in an undecorated form are 35 $kW/m^2$, 35 $kW \cdot min/m^2$ and 20 Ds, respectively, and the FAA Airworthiness limiting values for OSU heat release (peak, 5 min), OSU heat release (2 min) and smoke density for decorated panels are 65 $kW/m^2$, 65 $kW \cdot min/m^2$ and 200 Ds,

TABLE 2

Tested characteristics of various panels

| Test | FAA Limit | Airbus Limit (undecorated panel) | Panel 1 | 3 | 4 | 5 | 6 | 15 | 15 (with décor) |
|---|---|---|---|---|---|---|---|---|---|
| Flammability 60 s - burn length (mm) | 152 | 80 | 88 | 70 | 102 | 85 | 79 | 89 | 80 |
| Flammability 60 s - flame time (s) | 15 | 0 | 0 | 0 | 0 | 0 | 0 | 0 | 0 |
| Flammability 60 s - flame time - drips (s) | 3 | 0 | 0 | 0 | 0 | 0 | 0 | 0 | 0 |
| Flammability 12 s - burn length (mm) | 203 | 60 | 32 | 27 | 37 | 28 | 17 | 39 | 57 |
| Flammability 12 s - flame time (s) | 15 | 0 | 0 | 0 | 0 | 0 | 0 | 0 | 0 |
| Flammability 12 s - flame time - drips (s) | 5 | 0 | 0 | 0 | 0 | 0 | 0 | 0 | 0 |
| Smoke density - flaming (Ds) | 200 | 20 | 27 | 35 | 23 | 37 | 29 | 13 | 76 |
| Toxicity: HCN (ppm) | N/A | 150 | 2 | 2 | 2 | 2 | 2 | 2 | 2 |
| Toxicity: CO (ppm) | N/A | 1000 | 248 | 244 | 240 | 225 | 293 | 206 | 283 |
| Toxicity: NOx (ppm) | N/A | 100 | 8 | 11 | 12 | 10 | 12 | 12 | 11 |
| Toxicity: $SO_2$ (ppm) | N/A | 100 | 2 | 3 | 3 | 4 | 2 | 9 | 8 |
| Toxicity: HF (ppm) | N/A | 0 | 0 | 0 | 0 | 0 | 0 | 0 | 113 |
| Toxicity: HCl (ppm) | N/A | 0 | 0 | 0 | 0 | 0 | 0 | 0 | 50 |
| Heat release (2 mins) OSU (kW · min/m²) | 65 | 35 | 52 | 50 | 57 | 54 | 50 | 27 | 52 |
| Peak heat release OSU(kW/m²) | 65 | 35 | 48 | 60 | 62 | 63 | 49 | 29 | 59 |
| Heat release (2 mins) Cone Cal. (kW · min/m²) | N/A | N/A | 9.9 | 57.9 | 90.5 | 81.4 | 13.1 | 4.5 | — |
| Peak heat release Cone Cal. (kW/m²) | N/A | N/A | 13.2 | 135.8 | 241.3 | 180.7 | 10.7 | 8.2 | — |
| Time to ignition Cone Cal.(s) | N/A | N/A | N/A | 67 | 49 | 56 | 96 | N/A | — |

FAA Limits: DOT/FAA/AR-00/12, Aircraft Materials fire test Handbook, April, 2000.
Airbus Limits: based on experience of the state of the art for undecorated panels which fulfil, when decorated, ABD0031, Issue: F, Fire Worthiness Requirements Pressurized Section of Fuselage, June 2005. ABD0031 sets limits for parts inside an aircraft only and these parts would typically be decorated.
Flammability testing according to Airbus methods AITM2.0002A, AITM2.0002B (FAR 25.853 and FAR 25.855)
Smoke density testing according to Airbus AITM2.20007 (FAR 25.853)
Toxicity testing according to Airbus AITM3.0005
Peak heat release and heat release (2 mins) testing according to Airbus method AITM2.0006 (FAR 25.853) Cone Calorimeter testing according to ISO 5660-1

As indicated in Table 2, panel 15 in particular is suitable for aircraft applications. As can be noted from the table, panel 15, both with and without decor having been applied to a surface thereof, was shown to have suitable characteristics in terms of flammability, smoke density, toxicity and heat release values.

Thus, the invention as illustrated and described above provides for the fabrication of bio-based panels suitable for use in the interior of an aircraft. It will be appreciated that the use of natural fibres is advantageous in that it can provide an artefact which is lightweight (as natural fibres have lower weight than glass fibres) and biodegradable. In particular, respectively. The Airbus values are not fixed but are based on the experience of Airbus and are mirrored in the state of the art.

The surface coatings of vermiculite in conjunction with the non-halogenated flame retardant agent for panel 15 provide improved fire performance, and in particular provide OSU heat release (peak, 5 min) and OSU heat release (2 min) values below the abovementioned AIRBUS and FAA Airworthiness limiting values. As Table 2 indicates, the following superior heat release values were achieved: Undecorated panel: Heat release (peak, 5 min) 29 $kW/m^2$ (OSU), Heat release (2 min) 27 $kW \cdot min/m^2$ (OSU), Decorated panel: Heat release (peak, 5 min) 59 kW/m² (OSU), Heat release (2 min) 52 kW·min/m² (OSU).

The surface coatings of vermiculite in conjunction with the non-halogenated flame retardant agent for panel 15 provide improved smoke suppression and in particular provide smoke density values below the abovementioned AIRBUS and FAA Airworthiness limiting values. As Table 2 indicates, the following superior smoke density values were achieved: Undecorated panel: Smoke density 13 Ds, Decorated panel: Smoke density 76 Ds.

It is believed that these favourable heat release values are achieved by a synergistic combination of the use of the non-halogenated flame retardant agent, comprising the non-halogenated flame retardant and the smoke suppressant, on the natural fibre structure and the use of non-fibrous silicate fire resistant material, which as indicated above was applied to the surfaces of the pre-pregs or skins. Further, the combination of the non-halogenated flame retardant agent with the non-fibrous silicate fire resistant material (vermiculite), which has thermal insulating and water release properties, results in the superior flammability, smoke and toxicity values for the artefact.

Another advantage of the invention as illustrated and described is that a non-halogenated, environmentally benign flame retardant agent and environmentally benign fire resistant material is used. Furthermore, panel 15 can be easily and cost-effectively fabricated. In particular, no adhesive is needed to bond the core 12 to the skins 14, 16. On-site assembly of the panel 15 is possible.

The invention claimed is:

1. A method of fabricating an artefact, the method including
    treating natural fibres by applying a non-halogenated flame retardant agent to the fibres;
    forming at least one pre-preg from the treated natural fibres and a resin composition, the formation of the pre-preg including impregnating the treated natural fibres with the resin composition;
    forming an uncured artefact from a core or substrate and said at least one pre-preg, the formation of the uncured artefact including using the at least one pre-preg to provide a skin on at least one side of the core or substrate; and
    forming a cured artefact by curing the uncured artefact and thereby also bonding the skin to the core or substrate, wherein curing the uncured artefact is effected by compression moulding of the uncured artefact in a pre-heated mould which is at an initial temperature of between 100° C. and 120° C., the temperature in the mould subsequently being increased to between 130° C. and 145° C.,
    the method further including introducing a non-fibrous silicate fire resistant material using one or more of the following steps:
    (i) admixing the non-fibrous silicate fire resistant material with the resin composition prior to or during the forming of the at least one pre-preg,
    (ii) applying the non-fibrous silicate fire resistant material to an outer surface of the at least one skin of the uncured artefact, or to a surface of the pre-preg used to provide the skin,
    (iii) applying the non-fibrous silicate fire resistant material to an outer surface of the at least one skin of the cured artefact,
    the method further including treating the natural fibres with a smoke suppressant prior to the impregnation of the natural fibres with the resin composition and admixing a smoke suppressant in the resin composition that impregnates the fibres, wherein the non-halogenated flame retardant agent applied to the natural fibres includes a phosphate-based flame retardant and zinc borate.

2. A method as claimed in claim 1, in which the artefact is a panel, the formation of the uncured artefact including using the at least one pre-preg to provide a skin at least on opposed sides of the core.

3. A method as claimed in claim 1, in which the non-halogenated flame retardant agent is applied to the natural fibres in the form of an aqueous solution or aqueous dispersion of the flame retardant agent, and in which the treated natural fibres are dried prior to impregnating the treated natural fibres with the resin composition.

4. A method as claimed in claim 1, in which the non-halogenated flame retardant agent includes a non-halogenated flame retardant which acts in the condensed phase.

5. A method as claimed in claim 1, in which the smoke suppressant with which the fibres are treated is included in the non-halogenated flame retardant agent which is applied to the fibres.

6. A method as claimed in claim 1, in which the smoke suppressant with which the natural fibres are treated prior to their impregnation is a zinc borate.

7. A method as claimed in claim 1, in which the smoke suppressant admixed with the resin composition that impregnates the fibres is a zinc borate.

8. A method as claimed in claim 1, in which the non-fibrous silicate fire resistant material is admixed with the resin composition using step (i), the non-fibrous silicate fire resistant material being in the form of an aqueous dispersion of the non-fibrous silicate fire resistant material when it is admixed with the resin composition.

9. A method as claimed in claim 1, in which forming at least one pre-preg from the treated natural fibres and a resin composition includes heating the impregnated natural fibres in an oven at a temperature range of 120° C. to 140° C.

10. A method as claimed in claim 1, in which the core or substrate is of a honeycomb or foam material.

* * * * *